United States Patent [19]
Irwin

[11] Patent Number: 6,135,466
[45] Date of Patent: Oct. 24, 2000

[54] TRANSPORT DOLLY FOR LIFTING AND TRANSPORTING LAVATORY FIXTURES

[76] Inventor: Lawrence F. Irwin, 12860 San Fernando Rd., Sylmar, Calif. 91342

[21] Appl. No.: 08/987,713

[22] Filed: Dec. 9, 1997

[51] Int. Cl.[7] .................................................. B62B 1/00
[52] U.S. Cl. .................................. 280/47.28; 280/47.24; 280/47.29; 280/47.27; 280/47.19
[58] Field of Search .............................. 280/47.24, 47.29, 280/47.27, 47.19, 47.2, 47.33, 47.34, 47.35, 651, 652, 654, 47.17, 47.18, 645, 47.28

[56] References Cited

U.S. PATENT DOCUMENTS

| | | | |
|---|---|---|---|
| 2,957,700 | 10/1960 | Beaurline | 280/47.19 |
| 3,041,026 | 6/1962 | Wilson | 280/47.24 |
| 3,100,048 | 8/1963 | Halverson | 280/47.24 |
| 3,112,042 | 11/1963 | Leshner | 280/47.2 |
| 3,168,329 | 2/1965 | Goldschmidt | 280/36 |
| 3,997,181 | 12/1976 | Jaco et al. | 280/47.19 |
| 4,183,511 | 1/1980 | Marek | 269/17 |
| 4,355,818 | 10/1982 | Watts | 280/654 |
| 4,448,434 | 5/1984 | Anderson | 280/40 |
| 4,452,468 | 6/1984 | Eads et al. | 280/641 |
| 4,703,944 | 11/1987 | Higson | 280/30 |
| 4,722,511 | 2/1988 | Chitwood | 254/7 R |
| 4,969,660 | 11/1990 | Spak | 280/646 |
| 5,123,666 | 6/1992 | Moore | 280/47.28 |
| 5,160,154 | 11/1992 | Seydel et al. | 280/47.19 |
| 5,203,065 | 4/1993 | Peters | 29/281.4 |
| 5,373,593 | 12/1994 | Decky et al. | 4/661 |
| 5,445,398 | 8/1995 | Pierce | 280/47.26 |
| 5,474,312 | 12/1995 | Starita et al. | 280/47.19 |
| 5,716,183 | 2/1998 | Gibson et al. | 414/451 |
| 5,863,055 | 1/1999 | Kasravi et al. | 280/47.19 |

*Primary Examiner*—Brian L. Johnson
*Assistant Examiner*—Bridget Avery
*Attorney, Agent, or Firm*—James E. Brunton

[57] ABSTRACT

An article transport cart which is specially designed for lifting and transporting both toilets and urinals. The transport cart includes strategically located, adjustable lifting arms which can be used to engage and conveniently lift either a toilet or a urinal with a minimum of effort and without damaging the somewhat fragile fixture. Both the lifting arms and the tow plate of the cart can be adjusted relative to the cart frame so that they can be conveniently moved from an outwardly extending, operating configuration into a stowed position to enable the cart to be conveniently stored and transported. A locking mechanism is provided for locking the foldable toe plate in an operating position to stabilize the device when it is used to lift and transport wall-mounted urinals. The cart also includes a foldable toilet stabilizing means for restrainably engaging and stabilizing the toilet during lifting and transport.

4 Claims, 9 Drawing Sheets

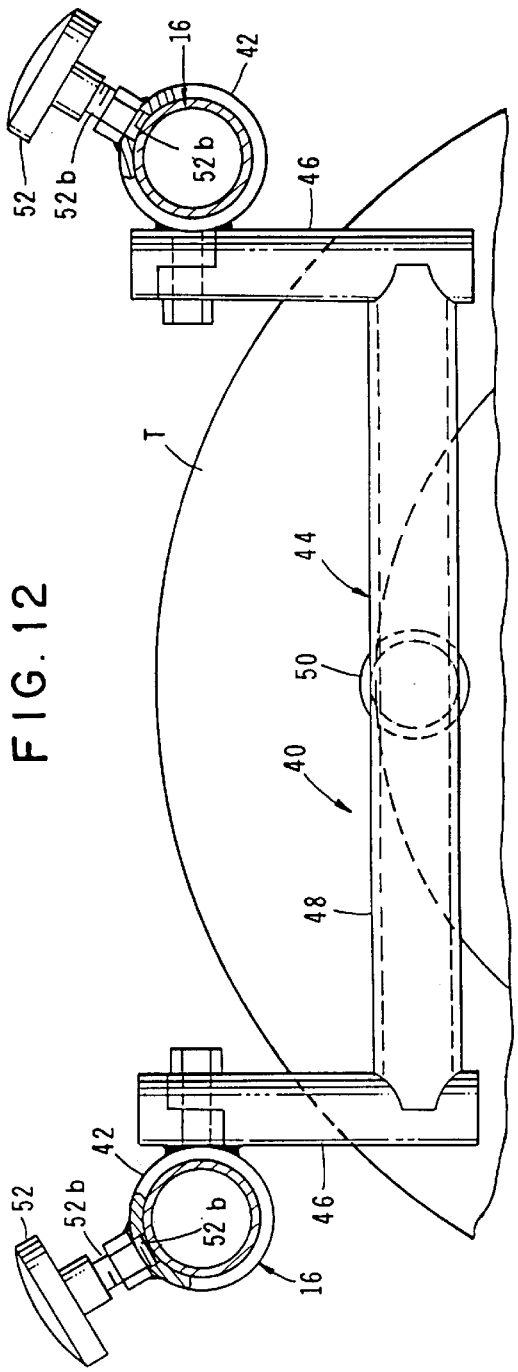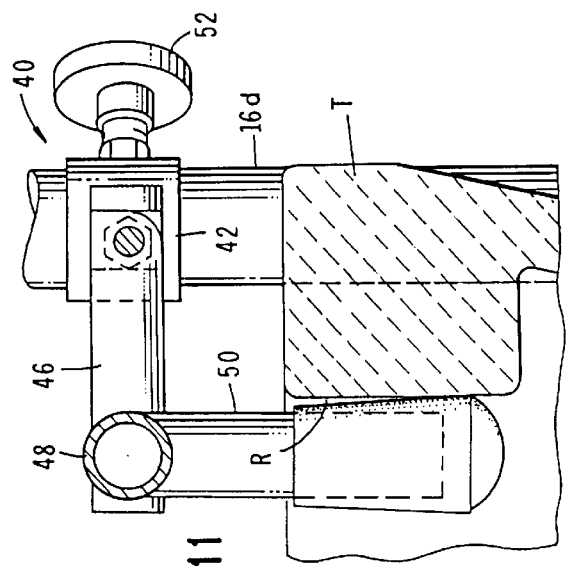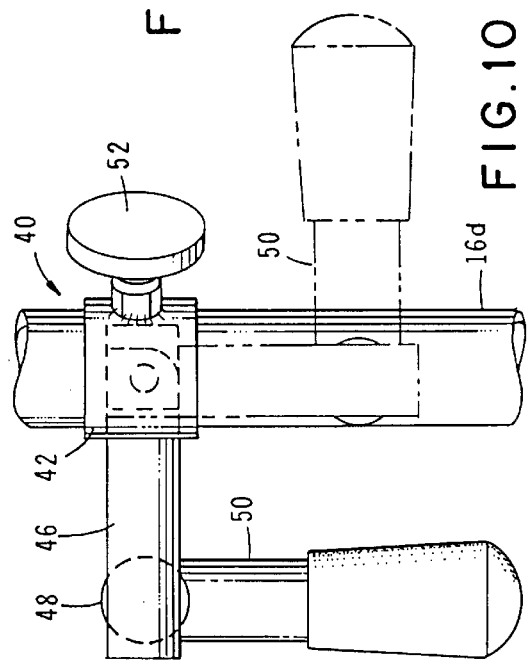

TRANSPORT DOLLY FOR LIFTING AND TRANSPORTING LAVATORY FIXTURES

BACKGROUND OF THE INVENTION

1. Field of the Invention

The present invention relates generally to article lifting and transport devices. More particularly, the invention concerns a dolly-like apparatus which is specially designed for use in lifting and transporting lavatory fixtures including urinals and toilets.

2. Discussion of the Prior Art

Article lifting and transport devices such as two wheeled transport dollies are well known in the art. However, such devices are not well suited for lifting and transporting irregularly shaped articles such as urinals and toilets. In this regard, because of the irregular configuration of such fixtures and their manner of installation, lifting of the fixtures for repair or replacement is often cumbersome and difficult. For example, both conventional toilets and urinals are heavy, difficult to grip and exhibit a tendency to easily tip and break. Therefore, as a general rule, moving and installation of such fixtures is a two-person operation so that the fixtures can be lifted and at the same time safely balanced. In the case of a toilet, because of its weight and cumbersome configuration, it is often necessary to break the toilet down into its separate components during the toilet removal and installation process. This is both inefficient and time consuming.

The thrust of the present invention is to overcome the prior art difficulties of handling lavatory fixtures by providing a specially designed, easy-to-use article transport cart which can be used by one person to safely and easily lift and transport cumbersome, irregularly shaped articles such as toilets and urinals. The improved cart includes strategically positioned, vertically adjustable lifting arms and a cooperating article stabilizing means which permits the fixtures to be lifted with minimum effort while they are being maintained in a stable orientation on the cart. Both the lifting arms and the stabilizing means are adjustable so that upon moving the foldable toe plate of the apparatus into a downward operating position, the cart can be used in a traditional manner such as a conventional two wheeled dolly. When the lifting arms, the stabilizing means and the toe plate are in their folded, stowed position, the cart assumes a low profile configuration for easy storage and transport.

A number of lifting devices have been suggested in the past for lifting and transporting toilets. One such device is disclosed in U.S. Pat. No. 4,722,511 issued to Chitwood. this patent describes a four wheeled cart having toilet engaging lifting bars which are selectively vertically movable by a hand actuated threaded rod.

Another somewhat similar prior art lifting device is disclosed U.S. Pat. No. 5,203,065 issued to Peters. The Peters device comprises a three-wheeled cart having a toilet engaging and lifting assembly which can be lifted by a hydraulic jack unit.

Still another hand cart for lifting and transporting toilets is described in U.S. Pat. No. 5,373,593 issued to Decky et al. This apparatus includes a 4-wheeled wheeled base and a frame designed to straddle the toilet. A hand operated screw jack and ball mechanism is used to secure and lift the toilet.

A common drawback of many of the prior art toilet lifting and transport devices is that the devices tend to be of somewhat complex construction generally making them difficult to use and expensive to manufacture. Another drawback of certain of the prior art toilet lifting and transport devices is that they are relatively heavy and bulky making them difficult to transport and store. Further, while the devices are usable for lifting and transporting toilets, they are not well suited for installing, removing and transporting urinals.

SUMMARY OF THE INVENTION

It is an object of the present invention to provide an improved article transport cart which is specially designed for lifting and transporting both toilets and urinals.

Another object of the invention is to provide an improved article transport truck of the aforementioned character which includes uniquely positioned, adjustable lifting arms which can be used to engage and conveniently lift either a toilet or a urinal with minimum effort and without damaging the somewhat fragile fixture.

Another object of the invention is to provide an improved article transport truck of the character described in which the lifting arms and the toe plate of the device can be adjusted relative to the cart frame so that they can be conveniently moved from an outwardly extending, operating configuration into a stowed position to enable the cart to be conveniently stored and transported.

Another object of the invention is to provide an improved article transport truck as described in the preceding paragraph which includes novel locking means for locking the foldable toe plate in an operating position to stabilize the device when it is used to lift and transport wall-mounted urinals.

Another object of the invention is to provide an improved article transport truck of the class described which also includes a foldable toilet stabilizing means for restrainably engaging and stabilizing the toilet during lifting and transport.

Another object of the invention is to provide an improved article transport cart which is lightweight, easy to use and is of a durable and rugged construction.

Another object of the invention is to provide an improved article transport cart of the class described in the preceding paragraphs which is specially designed so that it can be conveniently stored and transported.

Another object of the invention is to provide an improved article transport cart which is of simple construction, embodies a minimum number of moving parts and can be inexpensively manufactured and marketed.

BRIEF DESCRIPTION OF THE DRAWINGS

FIG. 10 is a view taken along lines 10—10 of FIG. 4.

FIG. 11 is a cross-sectional view taken along lines 11—11 of FIG. 4.

FIG. 12 is a cross-sectional view taken along lines 12—12 of FIG. 4.

DESCRIPTION OF THE INVENTION

Figure 1:
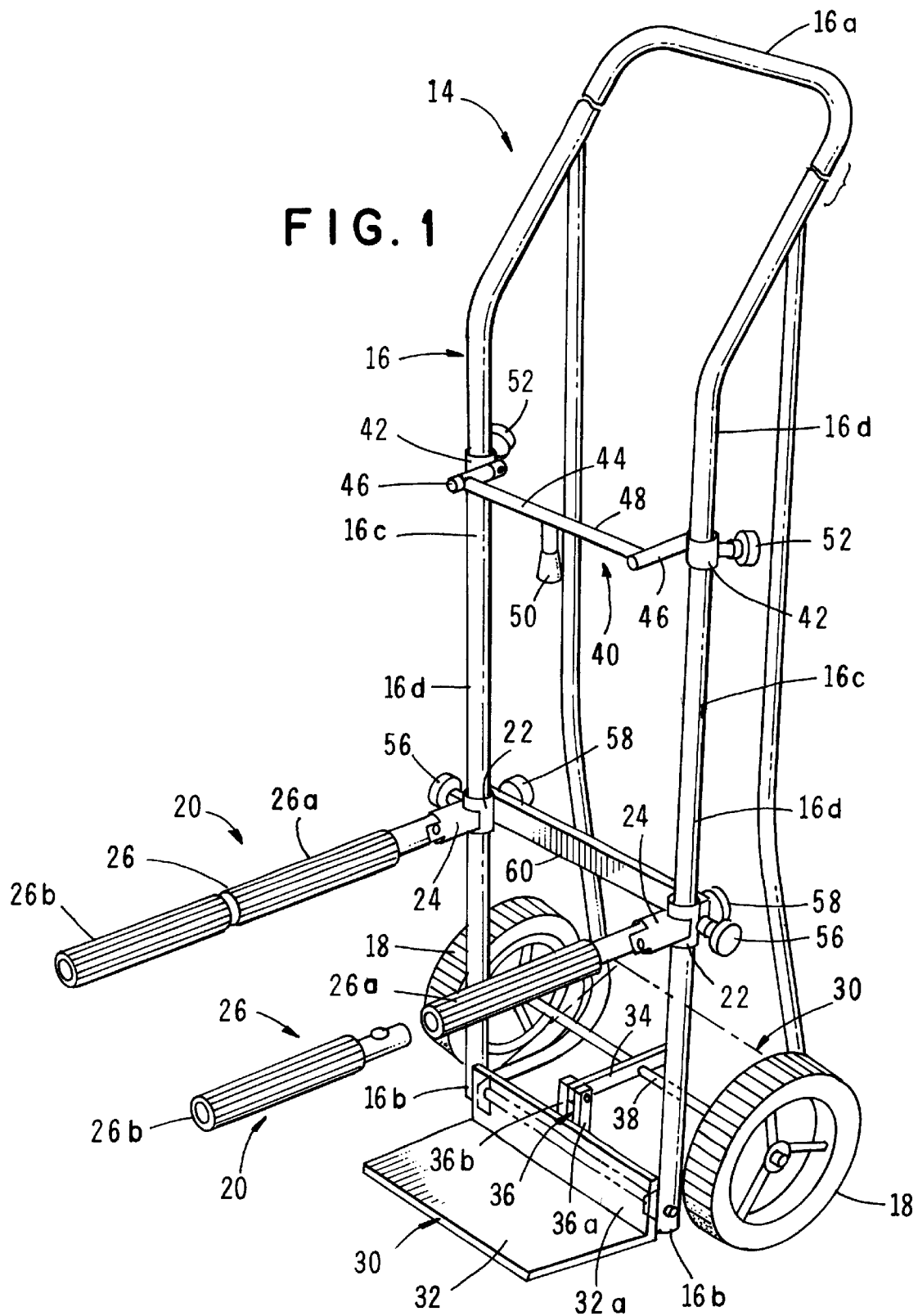
FIG. 1 is a generally perspective view of one form of the lift truck apparatus of the present invention.
Figure 2:
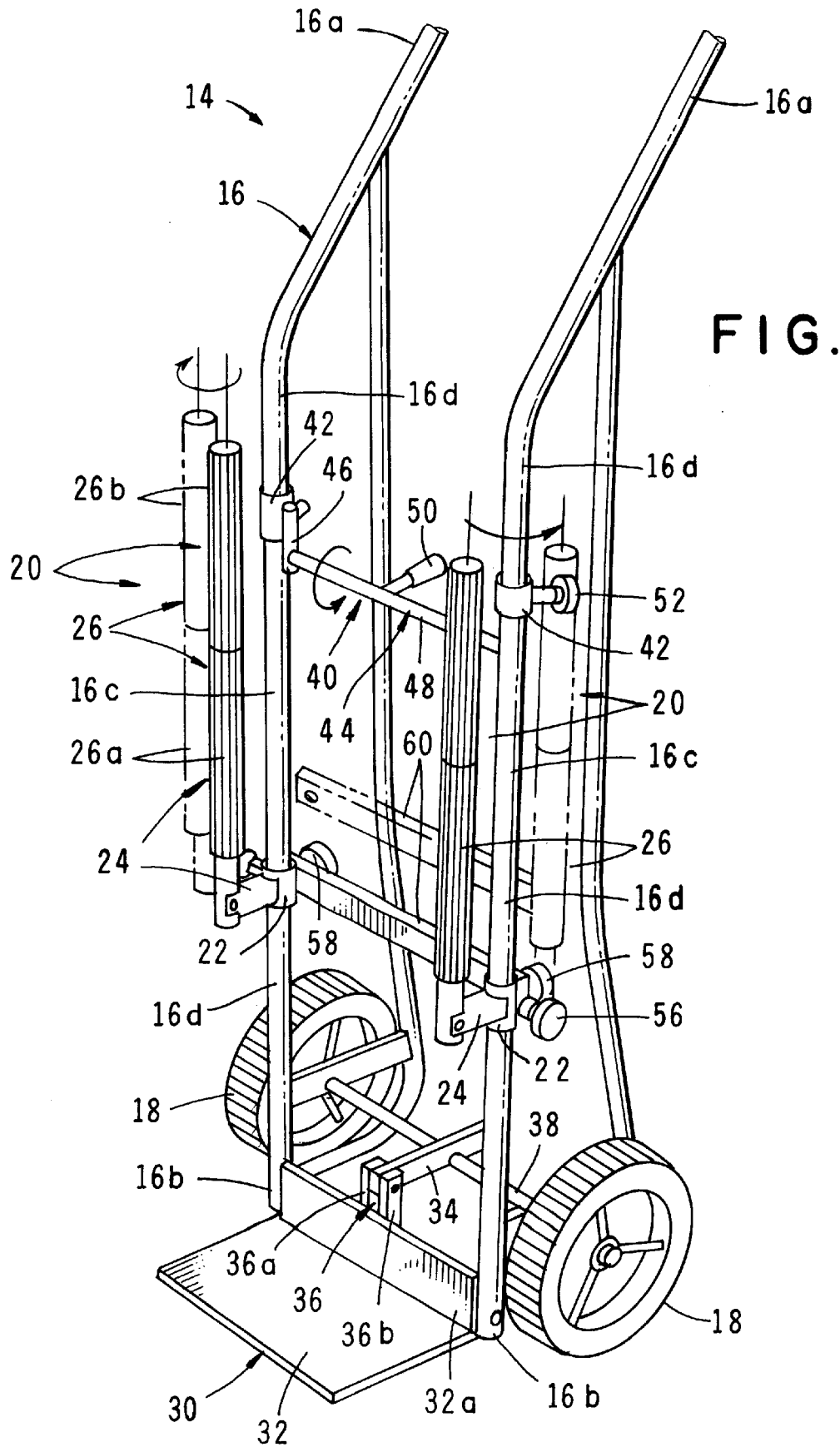
FIG. 2 is a generally perspective view of the lift truck similar to FIG. 1 but showing the lifting bars of the hand truck in an up-raised position.
Figure 3:
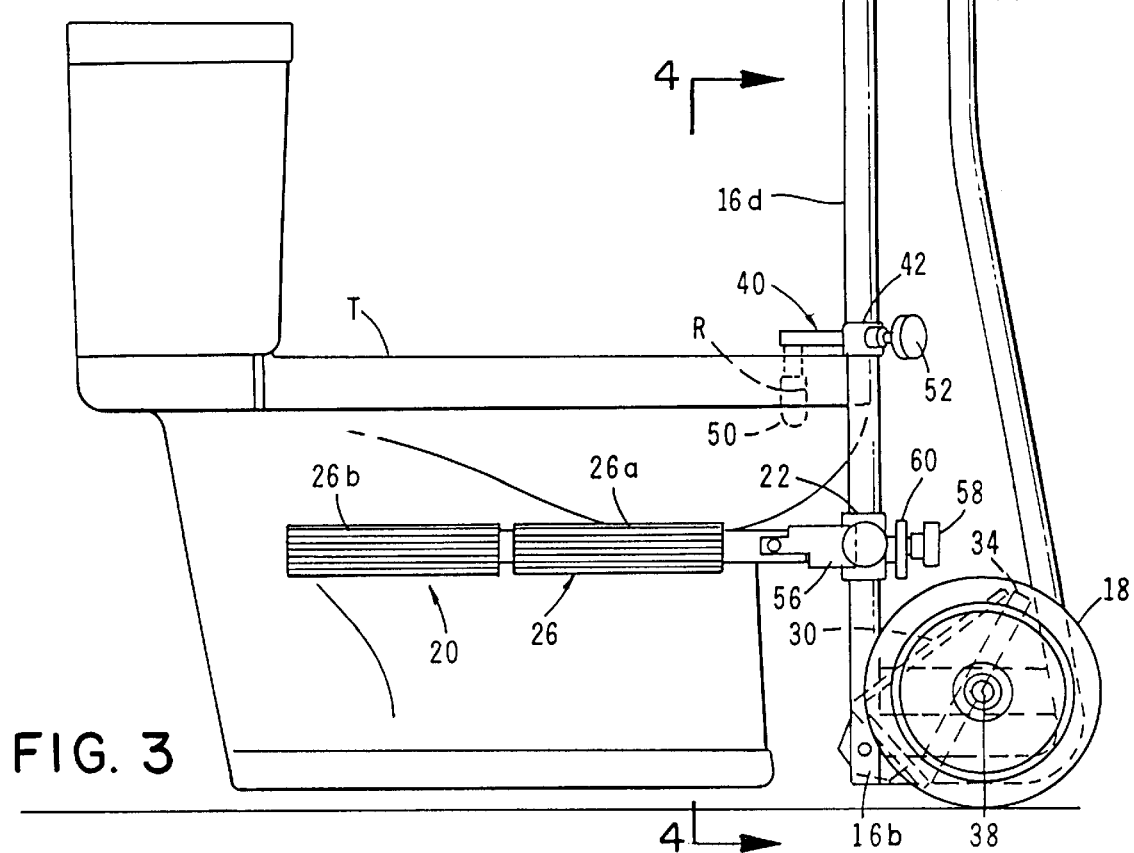
FIG. 3 is a side-elevational view of the lift truck shown in FIG. 1 illustrating the use of the device in lifting a toilet.

Referring to the drawings and particularly to FIGS. 1 through 3, one form of the lift truck or dolly of the present invention is there illustrated and generally designated by the numeral 14. Because of the novel design features of the lift truck as will presently be described, it is ideally suited for the lifting and transport of irregularly shaped articles such as urinals and toilets. The apparatus here comprises a tubular frame 16 having an upper handle portion 16a, a lower portion 16b and an intermediate portion 16c. A pair of wheels 18, are rotatably mounted on frame 16, proximate lower portion 16b.

Figure 8:
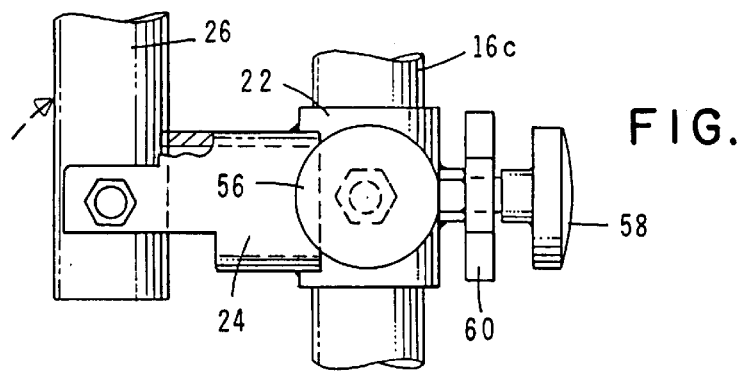
FIG. 8 is a view similar to FIG. 7, but showing the lifting arm in a raised position.
Figure 7:
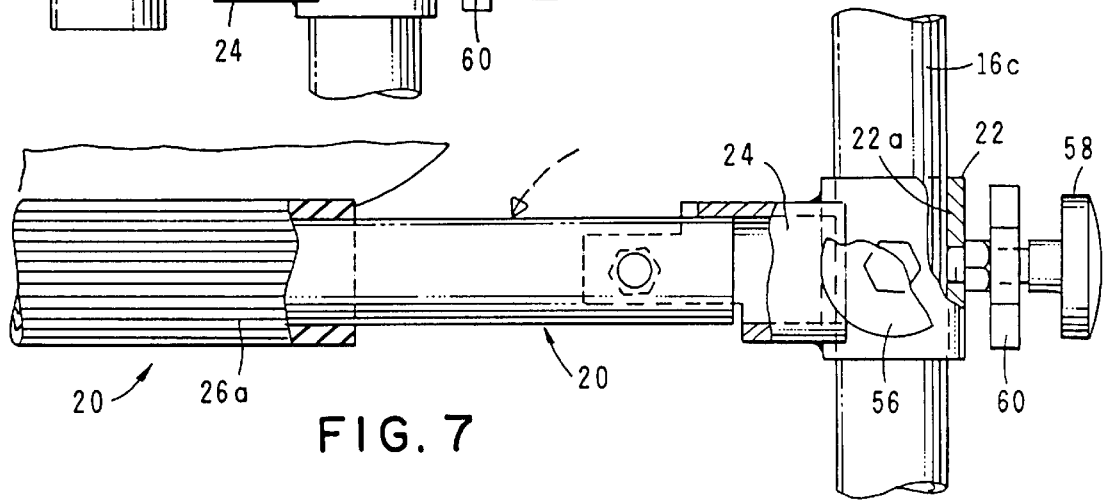
FIG. 7 is a view taken along lines 7—7 of FIG. 4.
Figure 9:
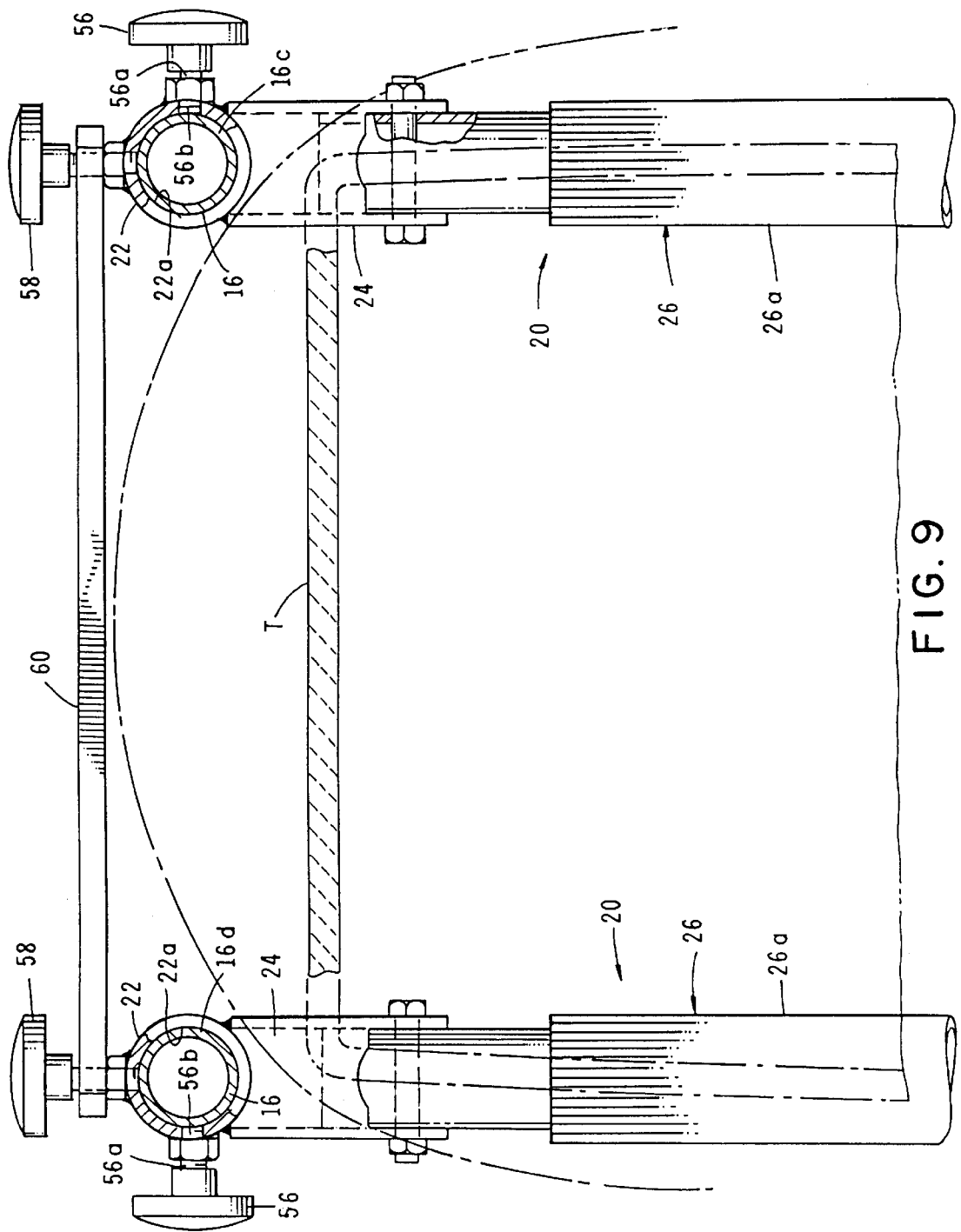
FIG. 9 is a cross-sectional view taken along lines 9—9 of FIG. 4.

Forming an important aspect of the lift truck of the present invention is a pair of lift arm assemblies 20 which are adjustably interconnected with the side members 16d of frame 16 for sliding movement along intermediate portions 16c of the frame. As indicated in FIGS. 1, 2, and 9, each of the lifting arm assemblies 20 comprise a bushing adapted for sliding engagement with the support frame so that the lift arm assemblies can be moved from a first elevated position to a second lowered position. Each bushing has an inside bore 22a only slightly larger than the outside diameter of the side frame members 16d so that the lifting arm assemblies can slide smoothly along the support frame (see FIG. 9). Connected to each of said bushings 22, is a connector member 24 to which an article engaging arm 26 is pivotally connected for movement between the extended operating position shown in FIG. 1 to the retracted, stowed position shown in FIGS. 2, and 8. In a manner presently to be described, each of the article engaging arms 26 can also be rotated relative to side frame members 16d from the front facing position shown by the solid lines in FIG. 2 into the rear facing or stowed position shown in the phantom lines of FIG. 2.

Figure 5:
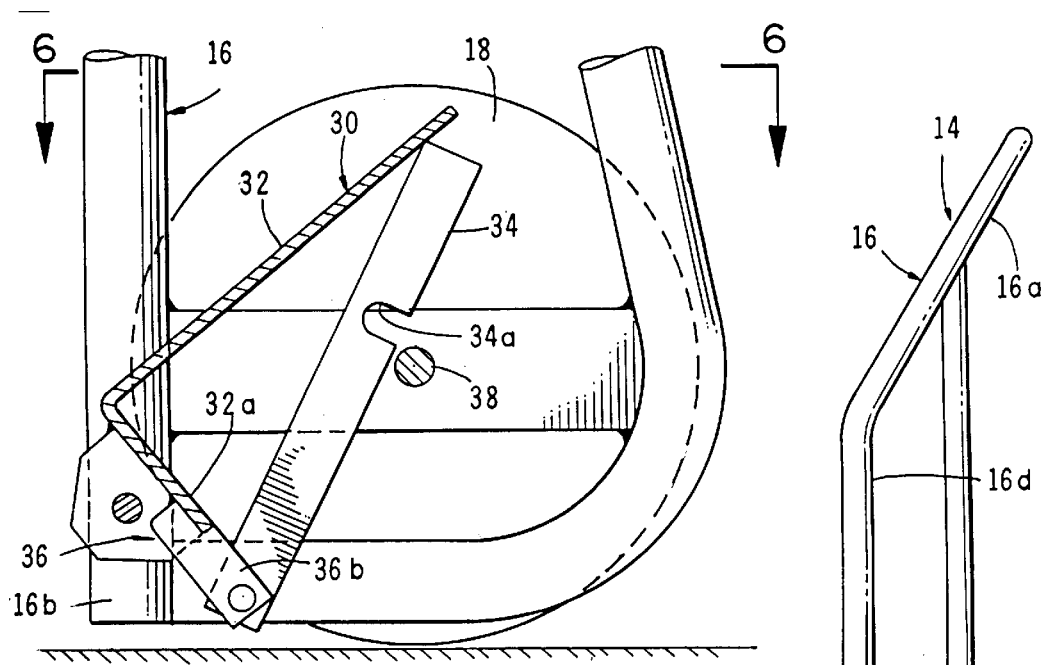
FIG. 5 is a cross-sectional view taken along lines 5—5 of FIG. 4.
Figure 13:
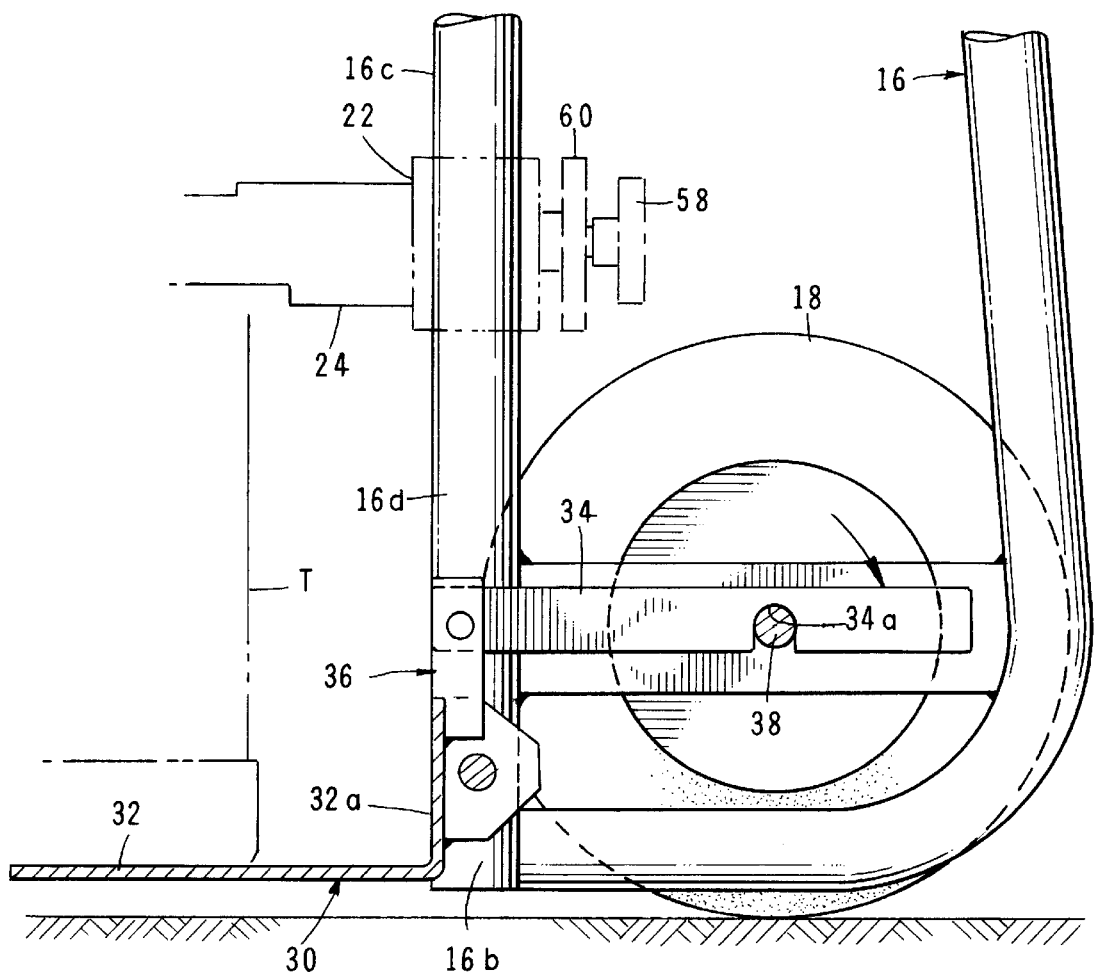
FIG. 13 is a view similar to FIG. 5 showing the toe plate in a downward position.

Also forming an important aspect to the apparatus of the present invention is a toe plate assembly 30 which is adjustably connected to frame 16 proximate the lower portion 16b thereof. More particularly toe plate assembly 30 is interconnected with the frame for pivotable movement between the downward, operating position shown in FIGS. 1 and 2 and the retracted or stowed position shown in FIGS. 3 and 5. Forming a part of toe plate assembly 30 is locking means for locking the toe plate 32 in the first operating or extended position shown in FIGS. 1 and 2. Referring particularly to FIGS. 2, 5, and 13, this locking means is here provided in the form of a locking bar 34 which is pivotally connected to toe plate 32 by means of a yoke assembly 36. Yoke assembly 36 comprises a pair of spaced apart support members 36a and 36b which are interconnected with a back wall portion 32a of toe plate assembly 30 in the manner shown in FIGS. 5 and 13. With this construction, locking bar 34 is pivotally movable from the downward, generally horizontal locking position shown in FIGS. 1, 2, and 13 to the unlocked position shown in FIG. 5.

Provided intermediate the ends of locking bar 34 is a generally "U" shaped slot 34a which is closely receivable over an axle 38 which extends between and rotatably supports wheels 18. More particularly, when the locking bar is in the locked position shown in FIGS. 1 and 2, "U" shaped slot 34a closely fits over axle 38 and maintains toe plate 32 in the outwardly extending, substantially, horizontal position shown in FIGS. 1 and 2. In a manner presently to be described, when the toe plate assembly 30 is in the locked position shown in FIGS. 1 and 2, the apparatus can be conveniently used for the installation and removal of a urinal such as that shown in FIG. 15. However, when it is desired to stow the apparatus of the invention the toe plate assembly can be readily moved into the stowed position shown in FIGS. 3 and 5.

Forming still another important feature of the apparatus of the present invention is an article stabilizing assembly, generally designated in the drawings by the numeral 40. Assembly 40, when in its operating position, functions to stabilize the lavatory fixtures as they are being lifted and transported by the apparatus of the invention. In the form of the invention shown in the drawings, article stabilizing assembly 40 comprises a pair of bushings 42, each of which has an inside diameter slightly larger than the diameter of the side frame members 16d which form intermediate portion 16c of the frame. Pivotably connected to bushings 42 is a fixture engaging frame 44. Frame 44 comprises a pair of outwardly extending stub arms 46 which are pivotably connected to frame 16 in the manner best seen in FIG. 11. Interconnected to and spanning stub arms 46 is an arm 48. Extending outwardly from arm 48 is a fixture engaging finger 50 which in a manner presently to be described, is adapted to engage the rim of a toilet "I" in the manner shown in FIG. 3. With the construction of the article stabilizing assembly 40 thus described, the assembly can be moved from the operating position shown in FIG. 1 to the stowed position shown in FIG. 2 by rotating stub arms 46 relative to bushings 42. (See also FIGS. 10, 11 & 12). As shown in FIG. 12, article stabilizing assembly 40 also includes a pair of clamping knobs, 52, which are threadably connected to bushings 42 so that when the knobs are tightened relative to the bushings 42 the extremity 52a of threaded shaft 52b of the knob assemblies will engage frame 16 in a manner to lock the article stabilizing assembly in the desired position along intermediate portion 16c of frame 16.

In a similar fashion, locking knob assemblies are provided as a part of each of the lifting arm assemblies 20. These locking knob assemblies, which are generally designated in the drawing by the numeral 56, function to lock the lifting arm assembly at a selected height along intermediate portion 16c of frame 16. As best seen in FIG. 9 each of the locking knob assemblies 56 comprises a shank portion 56a which is threadably receivable in a threaded bore provided in collars 22 and which terminates in an end portion 56b that can be moved into and out of locking engagement with frame 16 by rotating the locking knob either in a clockwise or counter clockwise direction.

Also comprising a part of each of the lifting arm assemblies of the invention is a second adjustment knob assembly 58 which is of similar construction to knob assembly 56, but functions to support a transversely extending bar-like member 60 which extends between bushings 22 in the manner best seen in FIGS. 1 and 9. When locking arm 60 is in the position shown in FIG. 9 it is apparent that lifting arm assemblies 26 cannot be rotated into the phantom line position shown in FIG. 2. However, by loosening knob assemblies 56 and pivoting member 60 to one side, each of the article engaging arms can be rotated relative to side member 16d of frame 16 from the forward position shown in FIG. 2 to the rear-ward stowed position shown by the phantom lines shown in FIG. 2.

Figure 4:
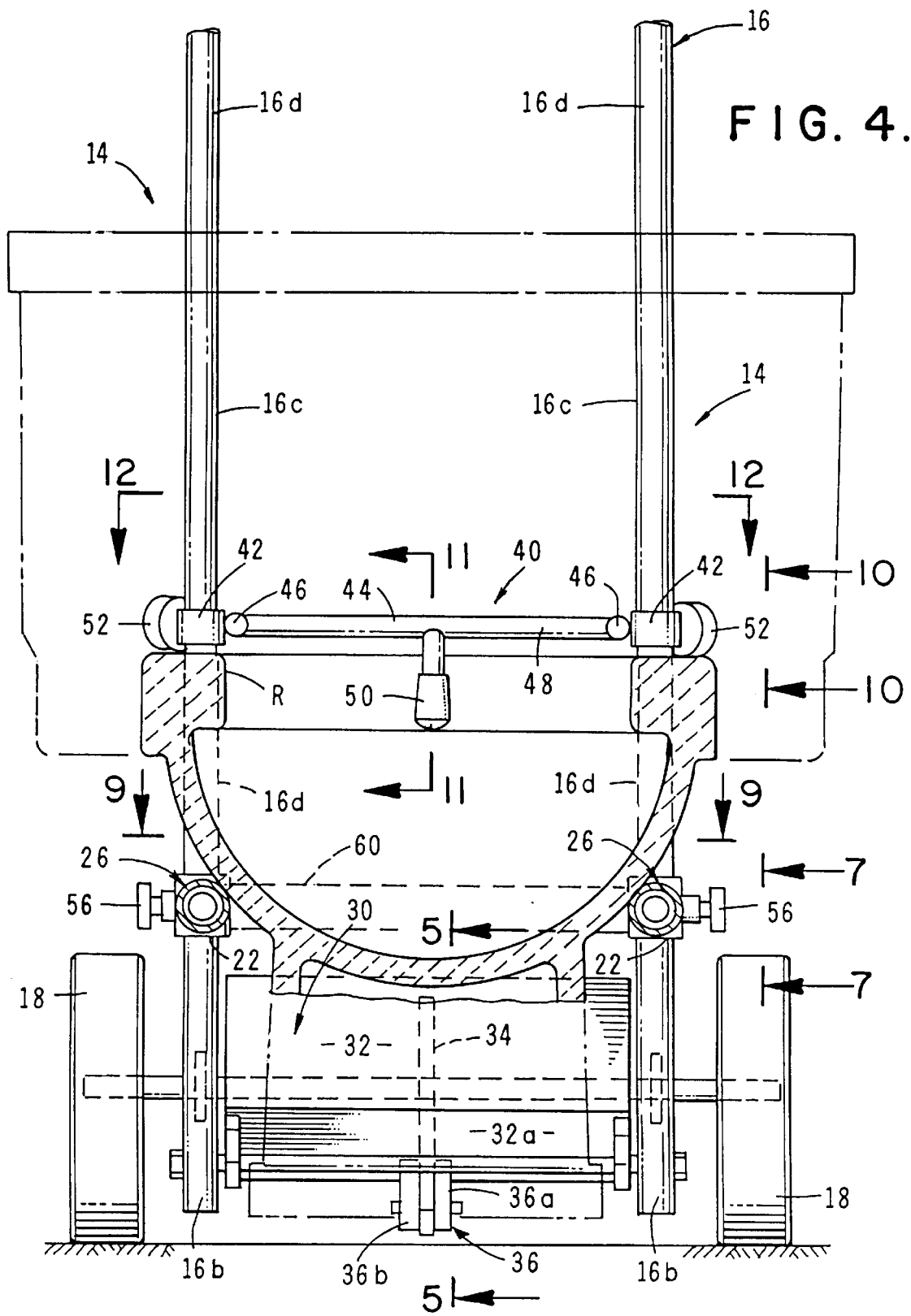
FIG. 4 is a view take along lines 4—4 of FIG. 3.
Figure 6:
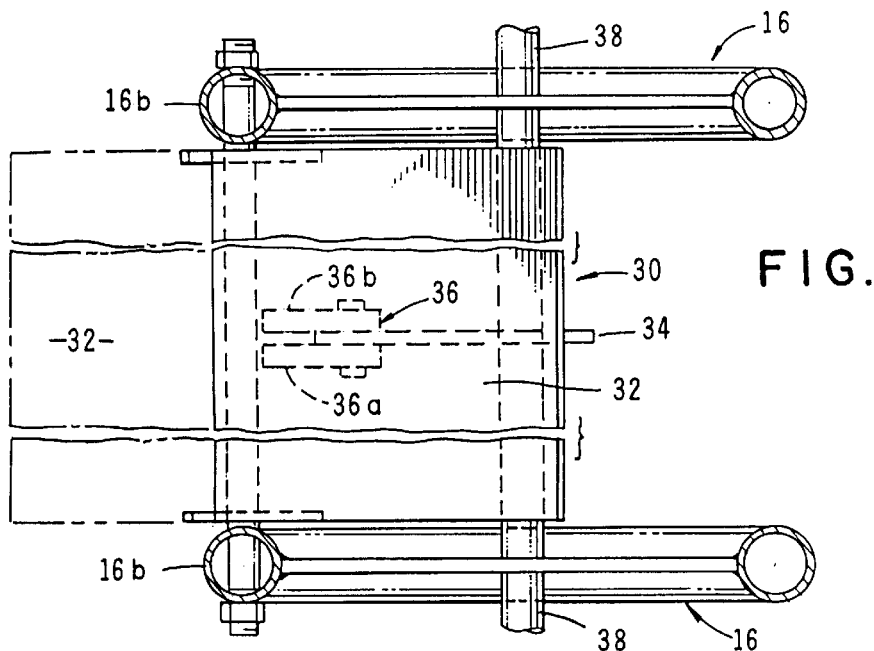
FIG. 6 is a cross-section view taken along lines 6—6 of FIG. 5.

Referring particularly to FIGS. 3 and 4, when the apparatus of the invention is used to lift a toilet, knob assemblies 56 are loosened so that the lifting arm assembly can be moved into the correct position shown in FIG. 3 wherein the lifting arms extend below the outside bowl portion of the toilet "T". It is to be noted that when the apparatus is being used to lift and transport the toilet "T", the toe plate assembly 30 is preferably in the stowed configuration shown in FIGS. 3 and 5. It is also to be noted that when the apparatus is being used to transport a toilet "T", the outer most segments 26b of the article engaging arms are interconnected with segments 26a.

With the article engaging arms positioned relative to the toilet in the manner shown in FIG. 3, the stabilizing assembly 40 is next slidably moved along side frame members 16d to a location where finger 50 of the stabilizing means extends downward into the toilet in engagement with the inner wall of the toilet rim "R" (see FIGS. 3, 4, 11 and 13). After the stabilizing assembly and the lifting assemblies are locked in position using locking knob assemblies 56 and 58, the toilet "T" can be easily lifted by grasping the handle portion 16a of the frame and tilting the dolly rearwardly and downwardly so that it pivots about axle 34 of the wheel assemblies.

Figure 15:
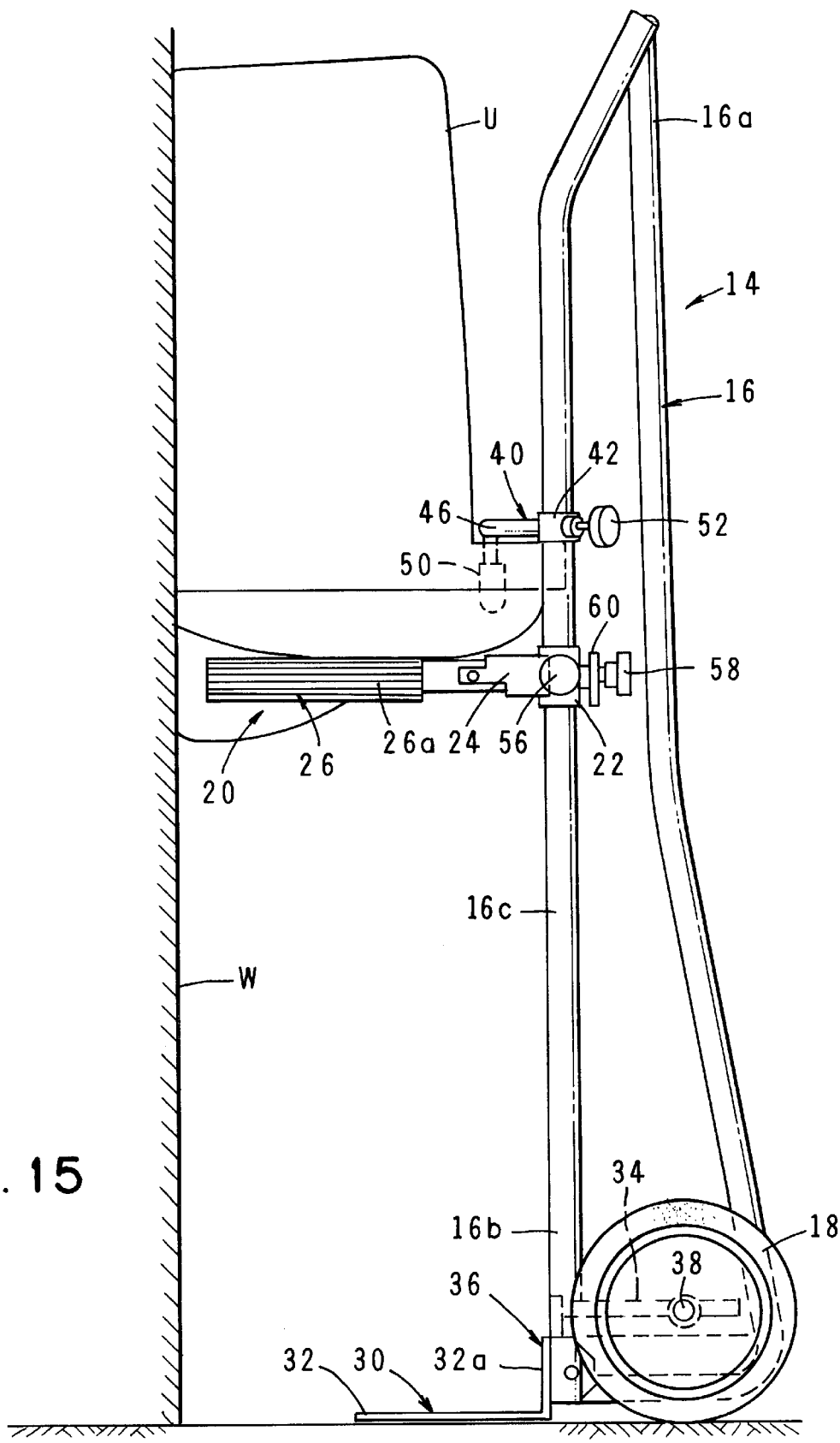
FIG. 15 is a side elevational view of the apparatus of the invention shown in use in connection with the lifting of a wall-mounted urinal.

When the apparatus of the invention is used to lift and transport a urinal "U" of the character shown in FIG. 15, the outboard segments 26b of the article engaging arms are removed from sections 26a. This done, the assemblage is adjusted to the correct height by loosening knob assemblies 56 and sliding the assembly upwardly along the intermediate portion 16c of frame 16. Upon re-tightening knob assemblies 56, the urinal "U" will be supported on the arms and tilting of the urinal will be prevented by finger 50 which is disposed in engagement with the inside rim of the urinal opening. It is to be noted that when the apparatus is used for lifting and transporting urinals the toe plate assembly is in the downward locked position shown in FIG. 15. With the toe plate assembly in this position, the toe plate will engage the ground and prevent a forward tilting of the frame 16 and stabilize the urinal in engagement with the wall "W" for interconnection therewith.

Figure 14:
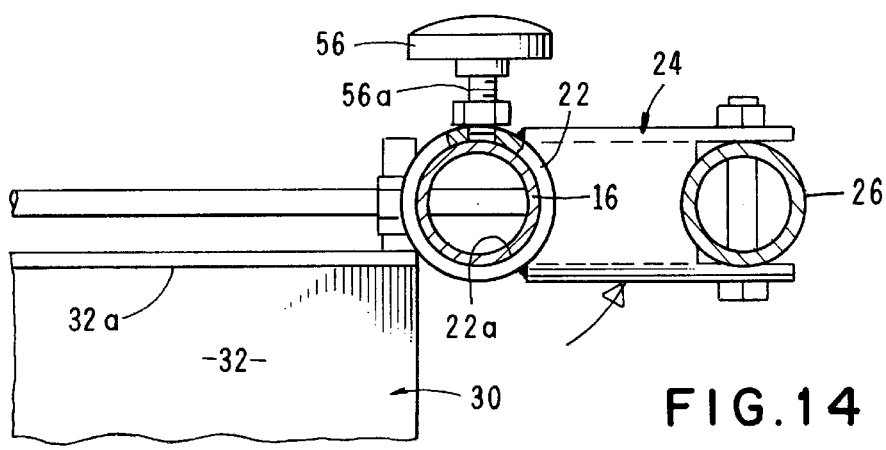
FIG. 14 is a view similar to FIG. 11, but showing the stabilizing mechanism rotated into the stowed position.

When it is desired to stow the apparatus of the invention, the article engaging arms can be pivoted into the upward position shown in FIG. 2. By then loosening knob assemblies 58 and removing cross-bar 60, the article engaging arms can be rotated relative to frame 16 from the front position shown in FIG. 2 to the stowed position shown in the phantom lines in FIG. 2 (see also FIG. 14). Similarly, by lifting locking bar 34 in a manner so that slot 34a clears axle 38, the toe plate assembly can be pivoted about the lower portion of the frame from the extended position shown in FIGS. 1 and 2 into the stowed position shown in FIGS. 3 and 5. With the lifting arms and the toe plate assembly thusly stowed, the apparatus is of a very low profile making transport and storage of the device simple and convenient.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. An article transport cart for lifting and transporting toilets and urinals having a bowl including a rim comprising:

(a) a support frame having an upper end portion, a lower end portion and an intermediate portion;

(b) a pair of wheels rotatably mounted to said support frame proximate said lower end portion;

(c) a lifting arm assembly slidably connected to said support frame for sliding movement along said intermediate portion thereof from a first location to a second location for engagement with the bowl, said lifting arm assembly comprising first and second spaced-apart bowl engaging arms;

(d) an article stabilizing assembly slidably connected to said support frame for sliding movement along said upper end portion thereof from a first location to a second location for engagement with the rim, said article stabilizing means comprising first and second bushings for sliding engagement with said support frame; and (e) an article retaining and stabilizing subassembly pivotally connected to said first and second bushings for movement between a first operating position and a second stowed position.

2. An article transport cart as defined in claim 1 further including a toe plate connected to said support frame proximate said lower end portion thereof.

3. An article transport cart as defined in claim 2 in which said toe plate is pivotally connected to said support frame for pivotal movement between a first operating position and a second stowed position.

4. An article transport cart as defined in claim 3 further including locking means for locking said toe plate in said first operating position.

* * * * *